United States Patent Office 3,107,359
Patented Oct. 22, 1963

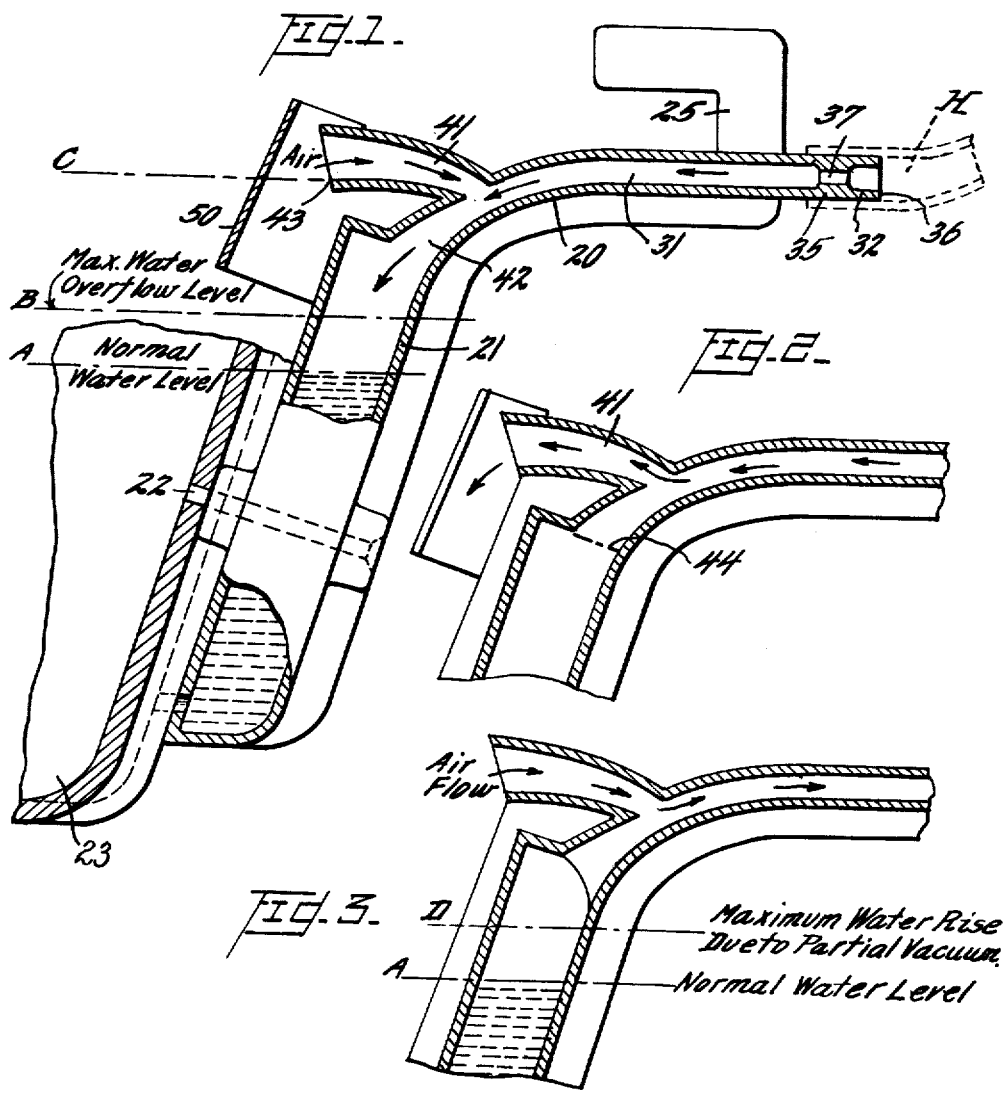

3,107,359
ANTI-SIPHONING DEVICE
Stanley H. Saulson, Baltimore, Md., assignor to Harlan M. Buck, Inc., Baltimore, Md., a corporation of Delaware
Filed Sept. 14, 1960, Ser. No. 56,009
9 Claims. (Cl. 4—6)

This invention relates to anti-siphoning devices, and is more particularly concerned with an anti-siphoning device adapted for use with receptacles into which water is to be delivered from a water faucet located more or less remotely from the receptacle.

As is known, nearly all cities, counties and other governing bodies, have sanitary and plumbing codes which generally provide, among their other requirements, rather rigid restrictions applicable to the connection of any device to the water supply lines, which might possibly permit contaminated water to back up or be sucked back into the water supply system.

Most of the sanitary codes referred to above require that there be a vertical gap of at least one inch between any water supply fitting, such as a water faucet, and the highest possible level to which water may rise in a receptacle into which it delivers water, even when the normal outlets of the receptacle are blocked or closed. These requirements account, for example, for the positioning of the lowermost ends of water faucets at least one inch above the rim of bathroom basins and kitchen sinks, in standard plumbing practice. Thus, upon the occurrence of any condition which might cause "back-siphonage" to occur, only air will be sucked back into the water supply system.

Many portable or temporarily connected devices, such as basins employed for therapeutic or like purposes, entail feeding water from a water supply line to the device by means of a flexible hose attached to the water faucet. In many cases, these devices are connected with the water supply system in violation of the sanitary code provisions of the locality.

It has heretofore been proposed that such devices be fed with water through a hose whose inlet end is attached to a water faucet by means intended to be in compliance with the aforementioned codes. Thus, it has been proposed to use faucet adaptors made of resilient or flexible material, and having longitudinally extending grooves along the interior surface thereof to form continuous passageways between the interior of the adaptor and the atmosphere. As will be apparent, the purpose of such passageways is to reduce the likelihood of excessive pressure being built up in the connecting hose, such as would occur, for instance, when a clamp is used to shut off or reduce the rate of flow of water through the hose. One form of such faucet adaptor, intended to prevent the backflow of water, is shown in patent to Graber No. 2,426,303. As pointed out by the patentee, back pressure that may be built up in the flexible hose causes the water flowing through the faucet to overflow into the lavatory through the grooves formed on the interior surface of the faucet adaptor.

It has been observed by actual test, however, that faucet adaptors heretofore proposed do not function adequately to prevent back-siphonage when a blockage or obstruction anywhere within the flexible hose builds up sufficient back pressure. In many such instances, contaminated water is nevertheless carried along with air back into the water supply system.

The principal object of the invention, therefore, is to provide an anti-siphoning device to be attached to the discharge end of a flexible hose whose opposite end is attached to a water faucet, and which is so constructed as to prevent back-siphonage of water from a receptacle, such as a basin or the like, upon which the device is mounted.

Another object of the invention is to provide an anti-siphoning device of the character mentioned, and which embodies means whereby, in the event of an obstruction to the flow of water in the receptacle, the water will be by-passed or diverted away from its normal path so as to prevent the building up of excessive pressure in the hose connecting the same to the water faucet, and so as to likewise prevent the hose from being forced off from the faucet.

Still another object of the invention is to provide an anti-siphoning device as above set forth, so constructed that in the event there develops in the water feed pipe, or other permanent part of the plumbing, any condition which might bring about back-siphonage, there will ensue a reduction of pressure within the path which the water normally takes through the device, sufficient to restrict the rise of the water level to a point substantially less than one inch above the maximum water level in the receptacle on which the device is mounted.

Another object of the invention is to provide an anti-siphoning device of the above character, in combination with a valve to be mounted on a portable basin to be supplied with water from a remotely located faucet through a flexible hose connection.

The foregoing objects may be achieved by an anti-siphoning device comprising a relatively elongated, tubular main passageway, to the inlet end of which a flexible hose may be attached, the opposite or inlet end of the hose being attached to a water faucet by any suitable form of faucet adaptor. The main passageway is preferably provided adjacent its inlet end, with a restricting orifice. Adjacent its opposite or lower end, the main passageway is joined by a relatively short, tubular, passageway or by-pass, the opposite or free end of which terminates at a vertical distance of at least one inch above the maximum overflow level of the receptacle on which the device is mounted.

In accordance with a further feature of the invention, the cross-sectional area of the main passageway, at its junction with the aforementioned by-pass is substantially identical with that of the by-pass at the junction.

Preferably, the portion of the main passageway along which the branch or by-pass is joined thereto, slopes or curves gently downward relative to the inlet end of the main passageway, and the branch or by-pass, preferably extending along a gentle upward curve, is located on the outer or convex side of the curved portion of the main passageway. Preferably also, the main passageway is of gradually increasing cross-sectional area along the portion thereof extending from its junction with the by-pass toward its lower or discharge end. Likewise, the by-pass is of gradually increasing cross-sectional area from the point of its junction with the main passageway toward its free or outer end.

The foregoing and other objects and advantages of the invention will be more fully apparent from the following detailed description, and from the drawings, in which:

FIGURE 1 is a view, partly in side elevation and partly in vertical cross-section, of an anti-siphoning device embodying the invention, mounted on a basin or other receptacle;

FIGURE 2 is a fragmentary view thereof, depicting the manner in which the device operates under so-called "blockage" conditions, such as might otherwise cause excessive build-up of pressure within the hose connecting the device to the water faucet; and FIGURE 3 is a view similar to FIGURE 2, depicting the manner in which the device operates when a condition of back-siphonage occurs through development of a fault in the water pipe or other permanent part of the plumbing which feeds water from the supply system to the water faucet.

Referring more in detail to the drawings, the anti-siphoning device of the invention is indicated generally by numeral 20.

Although the device may be used with any receptacle to which water is to be delivered from a more or less distant water faucet, it is herein shown and described as being used for feeding water from a faucet to a valve mechanism 21 pivoted at 22 adjacent the upper end of the side wall of a basin 23 constructed to serve as a sitz bath, such as described in Patent No. 2,947,994, granted August 9, 1960, jointly to Saul Saulson and the present applicant.

In FIG. 1, the line indicated by letter A represents the normal water level that may be maintained in the basin by means of suitablly disposed overflow openings (not shown) formed in the side wall thereof. The line indicated by letter B indicates the maximum overflow level, namely, the uppermost edge or rim of the basin, to which water in the basin could conceivably rise if perchance the aforementioned overflow openings became clogged or in some other manner obstructed.

In accordance with the invention, the anti-siphoning device comprises, essentially, a relatively elongated, tubular passageway 31, the inlet end 32 of which may be attached to the discharge end of the flexible hose H (shown in dotted lines in FIG. 1) whose inlet end is connected to a water faucet by any suitable form of faucet adaptor (not shown). The tube 31 may have an outside diameter of, say three-eighths of an inch and an inside diameter of one-quarter inch, but being reduced along an axial portion 35 extending for a length of, say three-sixteenths of an inch inwardly from a point about one-quarter inch from the outermost edge 36 of the passageway. Thus, there is provided a restricted orifice 37 adjacent the inlet end of passageway 31. In lieu of a localized restricted orifice to limit air flow, the passageway 31 may be formed with its inside diameter tapered towards a reduced diameter at the point of its connection with the hose.

Adjacent its opposite or discharge end, passageway 31, as indicated in the drawings, curves downwardly. Preferably, it extends along a rather gradual downward curve towards its connection with valve 21.

Joining the main passageway 31, preferably along the convex side of its curved portion and substantially at a right angle with respect thereto, is a relatively short, tubular, branch passageway or by-pass 41 extending in a direction such as to form, with the main passageway, a structure shaped somewhat like the letter Y turned ninety degrees from normal.

In accordance with the invention, it is essential that the branch passageway 41 form a smooth connection with the main passageway 31 at the junction between the two, and that the junction be free of any burrs or protuberances along the walls of the branch 41 and extending into the main passageway 31.

In accordance with the preferred embodiment of the invention, the inside diameter of the branch 41 is substantially identical with that of the main passageway 31 at the point of junction between the two.

Immediately beyond its junction with the main passageway 31, the branch passageway 41 preferably extends along a slight upward curve and is gradually enlarged in cross-sectional area so as to minimize resistance to air flow. As shown in the drawings, the outer end 43 of the branch 41 terminates at a point such that the lowermost surface of this passageway lies in a plane, indicated by line C in FIG. 1, at least one inch above the maximum possible water level B that might be attained in the basin 23 even under overflow conditions.

In the preferred embodiment of the invention illustrated in the drawings, the main passageway 31 is of gradually increasing cross-sectional area along the portion 42 thereof extending from its junction with branch passageway 41 towards the lower end of the main passageway.

In operation, with the inlet end 32 of the device connected to the discharge end of hose H whose other end is connected to a water faucet, water flowing along the main passageway 31 from its inlet end toward the chamber 21 will encounter no further restriction in normal use, and will normally be under sufficient velocity to flow past the junction of the branch passageway 41 and thence into the valve 21. Thus, if no obstructions are present in its path from the point of juncture of the two passageways to the valve 21, the velocity of the flowing water at the juncture reduces the pressure below the atmospheric level, permitting air to flow into the branch passageway 41 (in the direction indicated by the arrows in that portion of FIG. 1) and become mixed with the water flowing in passageway 31 (in the direction of the arrows shown in that portion of FIG. 1).

Should conditions occur which present an obstruction (such as indicated by dotted line 44 in FIG. 2) to the continued flow of water through the main passageway 31, then the flow of water becomes diverted, under the force of its velocity, so that it then follows the path indicated by the arrows in FIG. 2, into the branch passageway 41. Thus, excessive pressure cannot build up in the hose so as to cause its rupture or so as to force the faucet adaptor off of the faucet.

The water by-passed from the main passageway and discharging at the outer end 43 of the branch passageway may be caused to discharge downwardly toward the basin 23 as by means of a shield 50 suitably positioned adjacent to or at the outer end of the by-pass.

In FIG. 3, there is shown the manner in which the anti-siphoning device of the invention functions in the event there develops in the water pipe or other part of the plumbing from which the water is being fed to the device, a fault which gives rise to back-siphonage of water. Under such conditions, water will be sucked out of the hose. The pressure within the passageways will, under such condition, be reduced, thereby causing the water from basin 23 to rise under the influence of the resultant partial vacuum, to a level such as indicated by dotted line D in FIG. 3. This level D will be substantially less than one inch above the maximum water level B and hence well below the junction between the main passageway 31 and the branch passageway 41. Accordingly, air will flow in the direction indicated by the arrows in FIG. 3, through the branch passageway 41 and the main passageway 31 past the orifice 37 and into the hose H. By properly dimensioning passageway 41 in length and cross-sectional area, and by making its surface of low air-resistance, an adequate equilibrium may be established in relation to orifice 37 to insure a sufficiently low maximum level to which water from basin 23 may rise.

Thus, there is provided a device of relatively simple construction, which may be fed from a flexible hose connected to a faucet and which is provided with means whereby obstruction or blockage of the flow of water will not cause the feed end of the hose to be blown off the faucet, and which will be capable of use in full compliance with even the most rigid of the sanitary codes referred to above.

What I claim is:

1. In combination with a receptacle to be supplied with water from a water faucet, an anti-siphoning device mounted on said receptacle, said device comprising a relatively elongated tubular main passageway having its inlet end arranged for attachment to one end of a flexible hose whose opposite end is attached to a water faucet, said passageway having a restricting orifice therein adjacent said inlet end thereof, said passageway sloping downwardly toward its opposite end, an upwardly branching tubular passageway joined at one of its ends to said main passageway adjacent said opposite end of the latter, the opposite end of said branching passageway terminating at a distance of at least one inch above the maximum overflow level of said receptacle, the cross-sectional area of said main passageway and of said branching passageway being substantially identical at the junction therebetween.

2. The combination as defined in claim 1, wherein said main passageway extends along a downward curve adjacent said opposite end thereof, and wherein said branching passageway joins said main passageway along the convex side of said curved portion thereof.

3. The combination as defined in claim 2, wherein said passageways are each of circular cross-section, and wherein the diameter of said main passageway increases gradually from said junction toward said opposite end thereof.

4. The combination as defined in claim 2, wherein said passageways are each of circular cross-section, and wherein the diameter of said branched passageway increases gradually from said junction toward said opposite end thereof.

5. The combination as defined in claim 2, wherein said passageways are each of circular cross-section, and of gradually increasing diameter from said junction toward said opposite ends thereof.

6. The combination as defined in claim 1, wherein the cross-sectional area of said main passageway increases gradually from said junction toward said opposite end thereof.

7. The combination as defined in claim 1, wherein the cross-sectional area of said branching passageway increases gradually from said junction toward said opposite end thereof.

8. The combination as defined in claim 1, wherein the cross-sectional area of each of said passageways increases gradually from said junction toward the said opposite ends thereof.

9. An anti-siphoning device adapted to be mounted on a receptacle for feeding water through a flexible hose from a water faucet to the receptacle, comprising a relatively elongated tubular passageway having its inlet end arranged for attachment to one end of a flexible hose whose opposite end is attached to the water faucet, said tubular passageway being curved downwardly adjacent its opposite end, and having a restricting orifice adjacent its first-named end, a relatively short tubular passageway joined to the first-named passageway along the convex surface of said axially curved portion thereof, said first-named passageway being of gradually increasing cross-sectional area from the junction of said second-named passageway toward said opposite end of the first-named passageway.

References Cited in the file of this patent
UNITED STATES PATENTS

| | | |
|---|---|---|
| 290,603 | Pellier | Dec. 18, 1883 |
| 552,215 | Weinheimer | Dec. 31, 1895 |
| 2,151,200 | Goodrie | Mar. 21, 1939 |
| 2,161,204 | Shanley | June 6, 1939 |
| 2,250,291 | Boosey | July 22, 1941 |
| 2,552,398 | Briggs | May 8, 1951 |
| 2,947,994 | Saulson et al. | Aug. 9, 1960 |

UNITED STATES PATENT OFFICE
CERTIFICATE OF CORRECTION

Patent No. 3,107,359                    October 22, 1963

Stanley H. Saulson

It is hereby certified that error appears in the above numbered patent requiring correction and that the said Letters Patent should read as corrected below.

Column 5, line 20, for "branched" read -- branching --.

Signed and sealed this 14th day of April 1964.

(SEAL)
Attest:
ERNEST W. SWIDER

Attesting Officer

EDWARD J. BRENNER

Commissioner of Patents